No. 868,789. PATENTED OCT. 22, 1907.
J. O. LINDEN.
FERTILIZER SPREADER.
APPLICATION FILED NOV. 15, 1906.
5 SHEETS—SHEET 1.
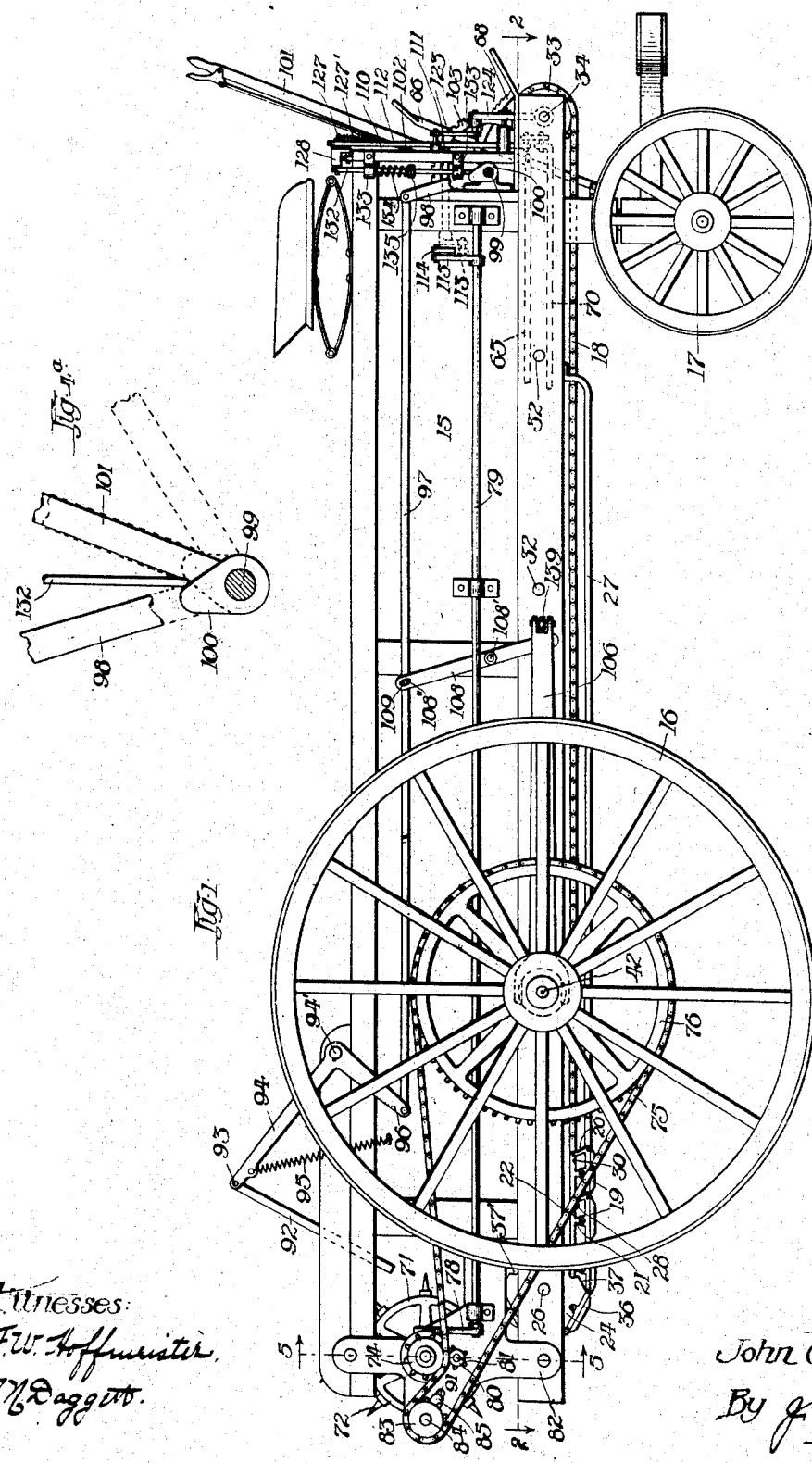
Witnesses:
F.W. Hoffmeister
T.N. Daggett.
Inventor
John O. Linden
By J.C. Warner,
Attorney

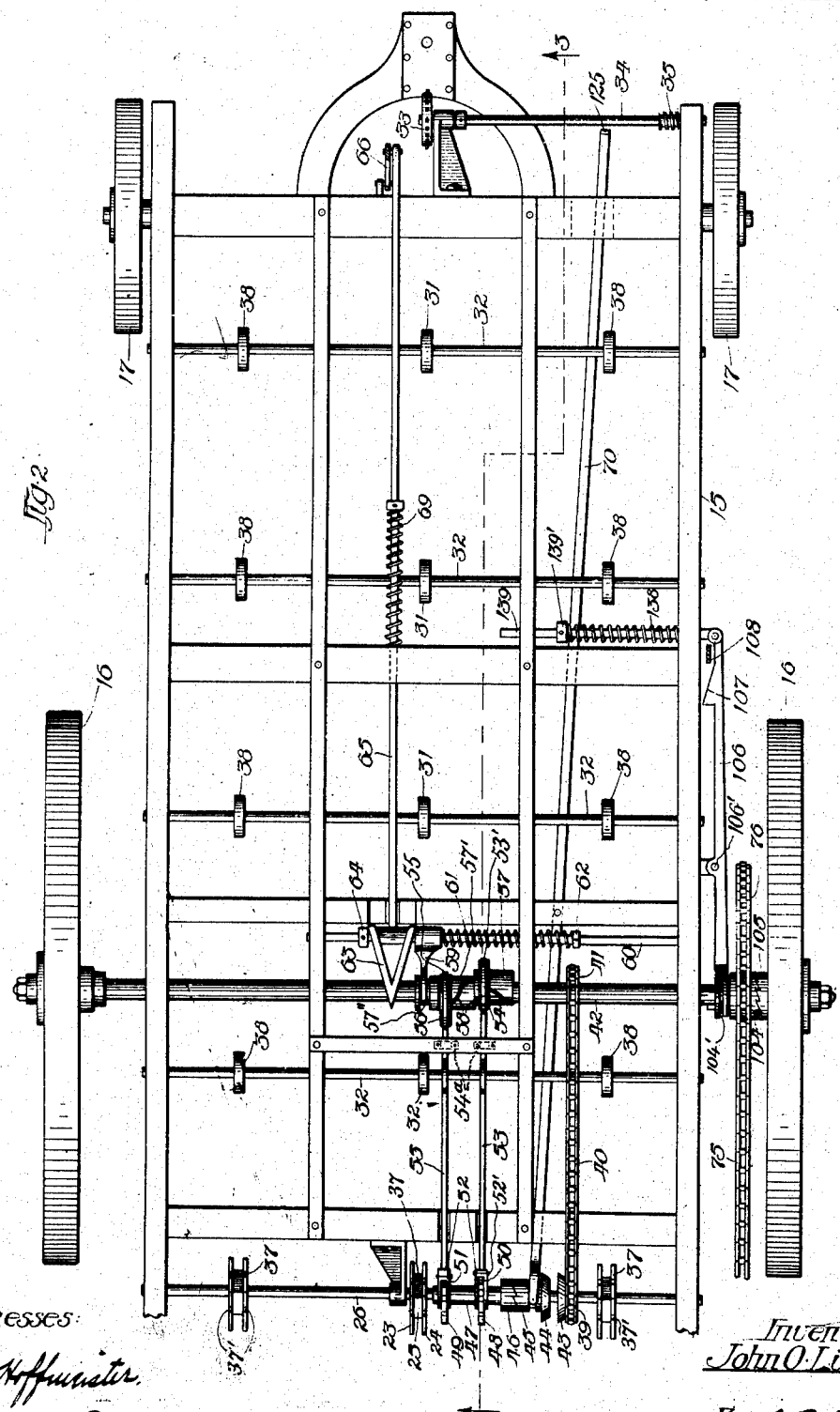

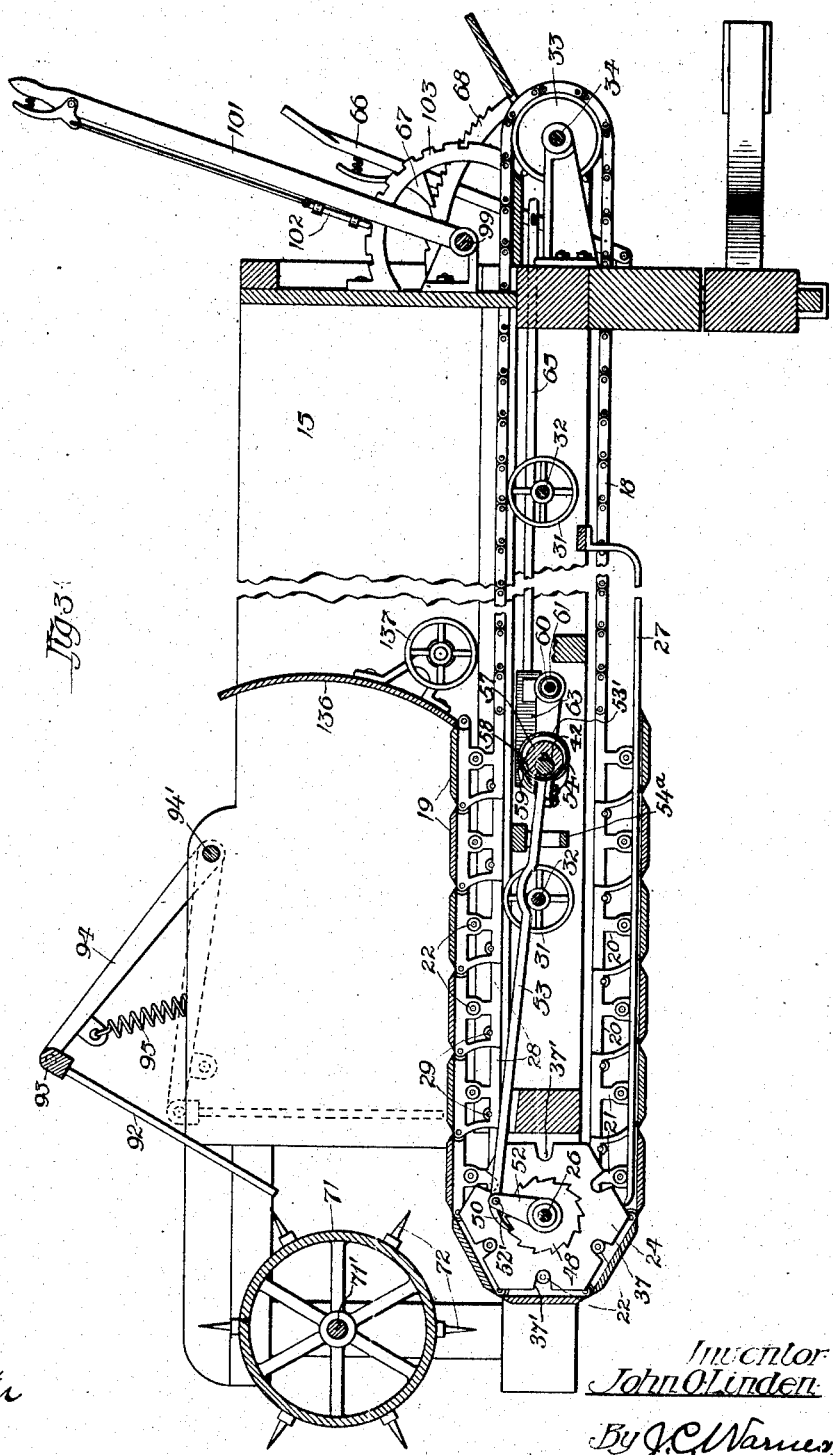

No. 868,789. PATENTED OCT. 22, 1907.
J. O. LINDEN.
FERTILIZER SPREADER.
APPLICATION FILED NOV. 15, 1906.
5 SHEETS—SHEET 4.
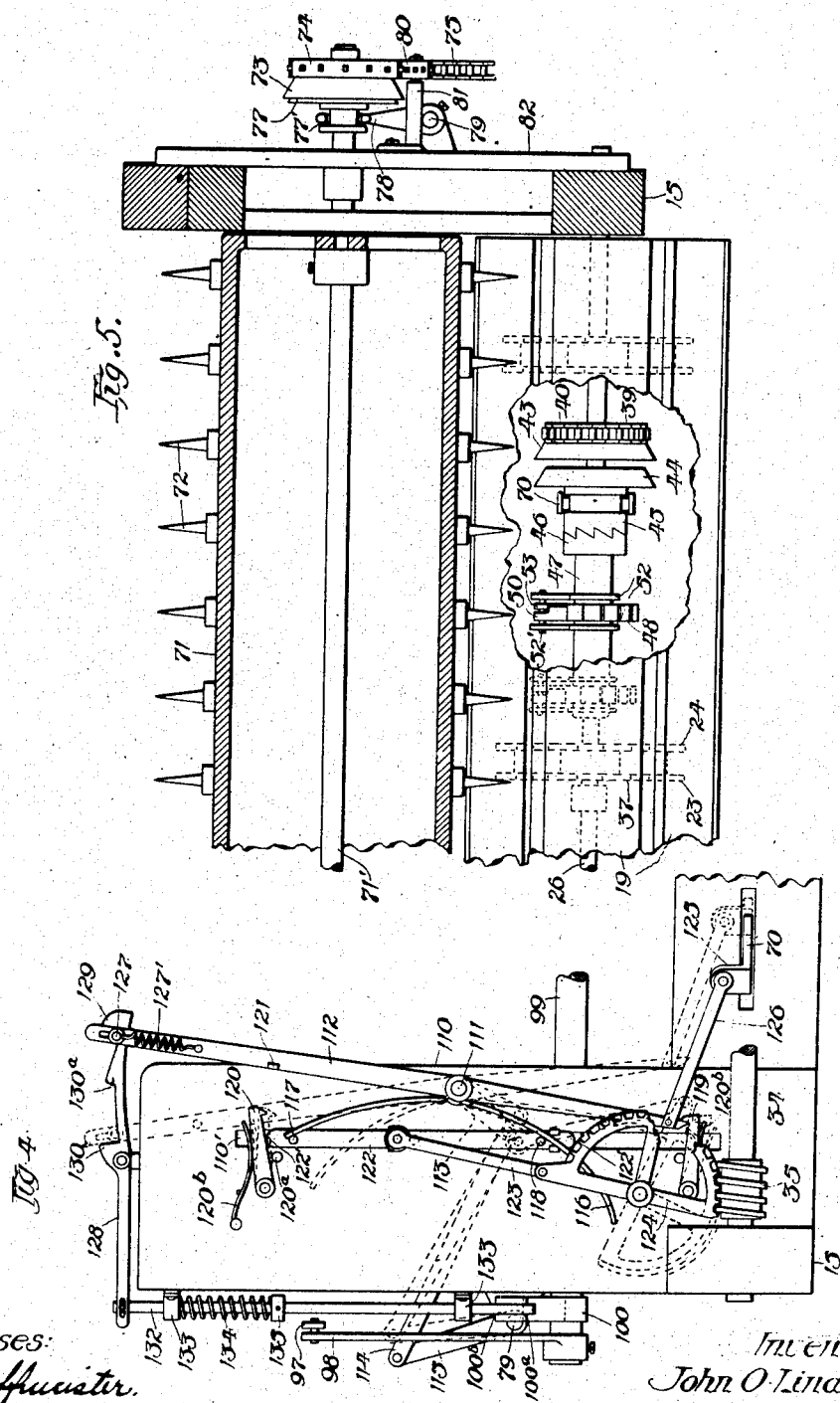

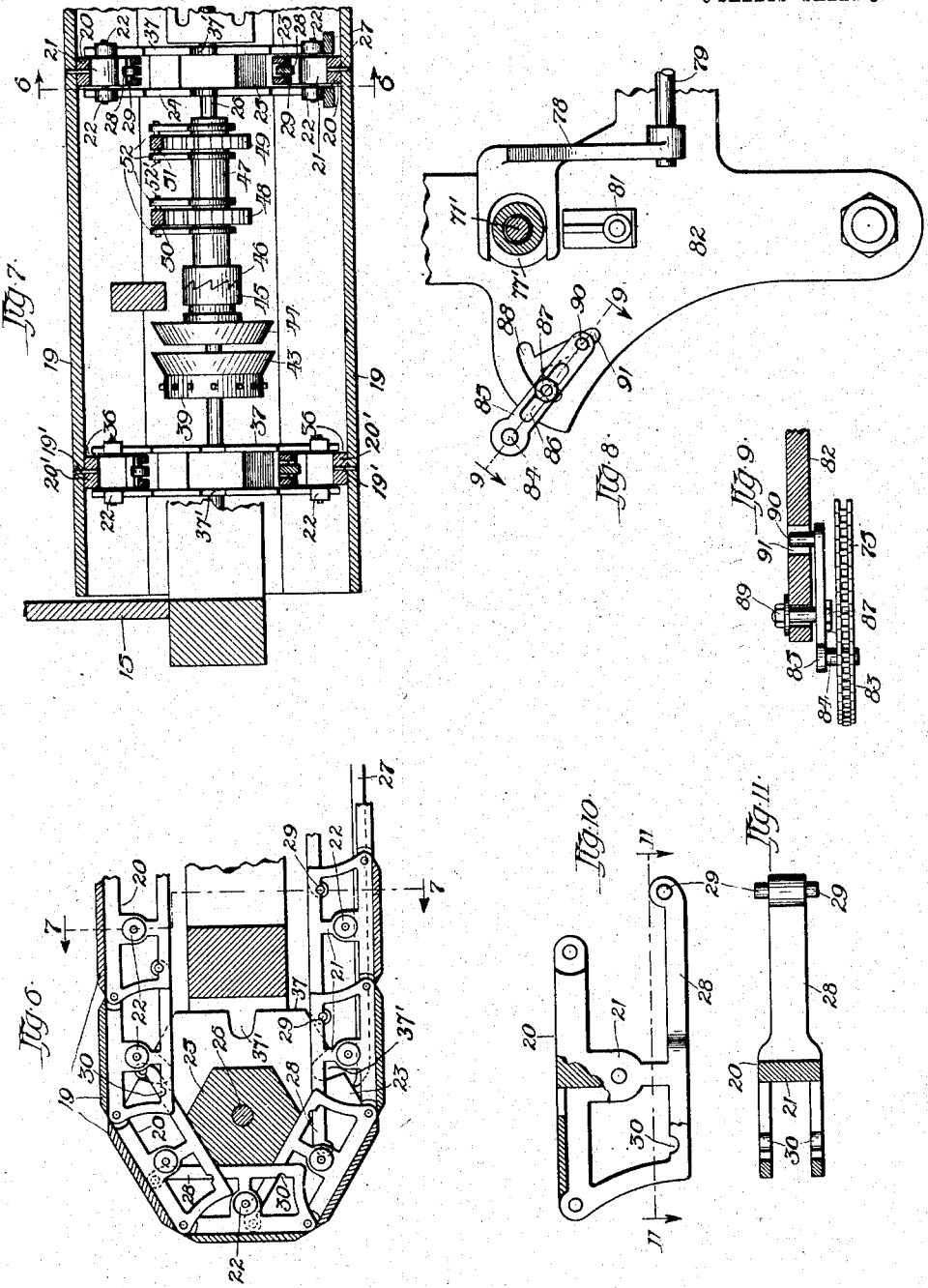

UNITED STATES PATENT OFFICE.

JOHN O. LINDEN, OF CHICAGO, ILLINOIS, ASSIGNOR TO INTERNATIONAL HARVESTER COMPANY, A CORPORATION OF NEW JERSEY.

FERTILIZER-SPREADER.

No. 868,789.  Specification of Letters Patent.  Patented Oct. 22, 1907.

Application filed November 15, 1906. Serial No. 343,480.

*To all whom it may concern:*

Be it known that I, JOHN O. LINDEN, a citizen of the United States, residing at Chicago, in the county of Cook and State of Illinois, have invented a new and Improved Fertilizer-Spreader, of which the following is a complete specification.

This invention relates to improvements in machines for spreading fertilizing material upon the ground, the object being to provide a simple mechanism for operating the spreader apron, and also to provide an apron of novel form.

Other objects of the invention will appear in the general description.

Referring to the accompanying drawings—Figure 1 represents a side elevation of a fertilizer spreader embodying my invention. Fig. 2 is a plan thereof with the apron and certain other parts removed, the said figure being also a section on the line 2—2 of Fig. 1. Fig. 3 is a section on the line 3—3 of Fig. 2. Fig. 4 is an elevation of the automatic clutch shifting mechanism employed. Fig. 4ᵃ is a detail showing the construction of the cam associated with the automatic means for controlling the apron at the rearward and forward end of its movements. Fig. 5 is a section on the line 5—5 of Fig. 1, designed to show the construction of the distributing cylinder, and with parts broken away in order to show the clutch mechanism on the apron shaft. Fig. 6 represents a fragmentary longitudinal section taken through the apron shaft immediately adjacent to the centrally arranged driving chain thereon. Fig. 7 is a transverse section taken forward of the apron shaft and through the parts disclosed in Fig. 6, as indicated by the line 7—7 in said figure. Fig. 8 shows a detail elevation of the chain tightener and clutch shifting mechanism adjacent thereto. Fig. 9 is a section on the line 9—9 of Fig. 8. Fig. 10 represents a side elevation, partly in section, of one of the special links of the apron driving chain; and Fig. 11 is a section taken as indicated by the line 11—11 of Fig. 10.

The machine comprises a box-like body 15, or frame, mounted on the rear supporting wheels 16 and the front wheels 17. The rear wheels are loosely journaled on their axle 42, and a device hereinafter to be described is provided for clutching the said wheels to their axle. The bottom of the body or frame is practically open, the bottom being formed by an apron movable rearwardly to discharge the material therefrom, and movable forwardly for a new load. The apron comprises a centrally arranged endless driving sprocket chain 18, a considerable portion thereof being formed of the special links 20 which are of a novel form, and to which are secured, by the bolts 19', the cross slats 19. These cross slats have their edges arranged close together so as to form a practically tight bottom, the ends of the cross slats 19 being hinged together by the chain links designated by the numeral 20' and preferably of the same type as the special links 20. The construction of these links 20 and 20', to which the slats 19 are attached, is clearly illustrated in Figs. 6, 10 and 11. Each link 20 (and 20') has an upper stretch to which a slat 19 is attached at the center, and the upper stretches are pivoted one to another. The said links are of skeleton form, and on opposite sides of their central portion 21 are rollers 22 for engaging the notches 37' in the sprocket wheels 37, which are fixed to the apron driving shaft 26. The sprocket wheels 37 consist each of two sections 23 and 24, which are held apart by means of the spacing block 25, the spacing block being equal in width to the chain links. The apron shaft 26 is journaled in the rear and bottom of the frame, or body, 15, and through these sprocket wheels 37 support and impart movement to the movable apron. The apron is supported when beneath the frame by the rollers 22 on the chain links, these rollers being arranged to engage the tracks 27, which are fixed to the underside of the vehicle frame. Each link 20 has at its lower or inner side a projecting arm 28, having opposite lugs 29 at its ends for engaging in notches 30 formed in the next or adjacent link, thus preventing the load from depressing the apron, and holding the part thereof which forms the moving bottom of the body of the vehicle in a horizontal plane. By this peculiar construction of link a very tight bottom is provided.

The special links 20 which constitute a part of the endless sprocket chain 18, and the links 20' of the chains 36, which bind together the ends of the slats 19, rest and move upon rollers mounted upon the cross shafts 32, which journal in the base of the frame 15, the links 20 of the chain 18, at the middle of the apron, resting upon the rollers 31, while the links 20' of the chain 36, at the sides of the apron, rest upon the rollers 38. The chains 36, which hold together the ends of the slats 19, are not endless chains, but extend only the length of the apron. The special links 20 of the centrally arranged endless chain 18, engage the middle sprocket 37 on the apron driving shaft 26 at its rear end, while the forward end thereof is made to engage the sprocket wheel 33, which is mounted on the transversely disposed shaft 34 at the front end of the spreader frame, as clearly shown in Figs. 2 and 3. A worm 35 is fixed to the outer end of the said shaft 34, the function of which will be hereinafter described.

To return the apron to its forward position after the load has been discharged therefrom, the following described mechanism is employed: Loosely mounted on the apron shaft 26 is a sprocket wheel 39, from which a chain 40 is made to pass to a sprocket wheel 41 on the rear axle 42 of the vehicle, thereby communicating motion from said axle to said sprocket wheel 39. Formed preferably integral with the sprocket wheel 39 is the driven member 43 of a cone clutch, designed to be engaged by its coöperating clutch member 44. The clutch member 44 is longitudinally movable on the shaft 26, but is splined thereon and hence made to rotate therewith. The sprocket wheel 39 and its attached clutch member 44 will rotate continuously while the vehicle is in motion in a proper direction to return the apron, and hence it is apparent that to return said apron the shaft 26 must be made to rotate with said sprocket wheel and clutch member. This is done by moving the clutch member 44 into engagement with the clutch member 43 by means of the horizontally swinging shifting lever 70. This lever 70 engages in the usual groove-and-fork manner with the member 44, and extends forwardly to the front end of the spreader, where it is automatically operated in a manner to be hereinafter described. On the opposite end of the clutch member 44 is formed the toothed clutch head 45, which is adapted to engage with a toothed coöperating clutch head 46 on a sleeve 47, which is operated by a ratchet mechanism and associated parts for moving the apron rearwardly. This mechanism for feeding the apron rearwardly will now be described. Formed preferably integral with the sleeve 47 are the two ratchet wheels 48 and 49, and on both sides of these ratchet wheels on the said sleeve are mounted the rocking arms 52. Suitably mounted between these arms on the pins 52′ are the pawls 50 and 51, engaging, respectively, the ratchet wheels 48 and 49. To operate these pawls and ratchet wheels at variable speeds and hence move the apron rearwardly at different speeds, eccentric rods connect same with eccentrics, which are fixed to the axle 42. The rod 53 connects at its rear end with the arms 52 adjacent to the ratchet wheel 48 through the pin 52′, and at its forward end through its strap 53′ engages the eccentric 54. In a similar manner the eccentric rod 55 connects at its rear end with the pawl 51 and arms 52 adjacent to the ratchet wheel 49, and at its forward end through its strap 55′ engages the eccentric 56. The eccentrics 54 and 56 are mounted respectively on the oppositely disposed eccentric sleeves or hubs 57 and 57′, which are fixed together and feathered on the axle 42. On the eccentric sleeves 57 and 57′ are formed oppositely inclined spiral ribs 58 (see Fig. 2), which engage corresponding transverse channels in the eccentrics 54 and 56. Obviously, by moving the eccentric sleeves 57 and 57′ lengthwise, they will be drawn through the eccentrics 54 and 56, and the spiral ribs 58 will cause a rotary movement of said eccentrics relative the axle 42, thus changing the throw of the eccentrics and accordingly affecting the extent of movement imparted to the pawls 50 and 51. Lateral movement of the eccentrics 54 and 56 is prevented by the depending guard fingers 54ª (see Figs. 2 and 3), which are secured to the bottom of the frame and are located adjacent to the connecting rods 53 and 55 and on either side thereof.

To produce the endwise movement of the eccentric sleeves 57 and 57′, the sleeve 57′ is provided, at its end, with an annular channel 57″, which receives the fingers of a shifting arm 59. This shifting arm sleeves on a fixed rod 60, and is moved thereon in one direction by means of a spring 61 surrounding the rod and engaging at one end the collar 62 on said rod, and at the other end engaging the sleeve portion of the arm 59 which surrounds the rod. The arm 59 is moved in the opposite direction by means of a V-shaped cam 63, which at one side contacts the sleeve portion of the arm 59, and at the other side contacts or engages with a collar 64, fixed to said rod 60. From this shifting device 63 a rod 65 extends forwardly and connects with a lever 66 at the front end of the spreader frame. The lever 66 is within convenient reach of the operator and carries a spring pressed pawl 67 (see Fig. 3) for engaging with a locking rack 68. The rod 65 is held normally forward, and the cam 63 in an inoperative position by means of the spring 69 on said rod.

Supported in the rear portion of the vehicle body, above and slightly rearward of the rear end of the apron, is the breaker or distributing cylinder, consisting of a cylinder portion 71 carrying the teeth 72, the cylinder being mounted upon the shaft 71′. The bottom of the cylinder travels in an opposite direction from the movement of the apron while the said apron is discharging the load, but remains idle when the apron is returned to its forward position. The distributing cylinder is driven by the following described means. Sleeved loosely on the cylinder shaft 71′ is a friction clutch member 73, which has formed in connection therewith a sprocket wheel 74, from which a chain 75 extends to and connects with a sprocket wheel 76 rotatively fixed on the axle 42. Movable endwise of the distributing cylinder shaft, but splined thereto, is a coöperating clutch member 77, adapted to engage with the clutch member 73. The hub of this clutch member 77 is provided with an annular channel 77′ for receiving fingers of the shifting arm 78 mounted on a rock shaft 79, which extends along the outer side of the vehicle body and is automatically actuated by a device at the forward end of the spreader in a manner to be hereinafter described.

To produce movement of the distributing cylinder in the proper direction the sprocket chain 75 is made to engage the under side of the sprocket wheel 74, as clearly shown in Fig. 1, the rear end of said chain 75 being supported upon the adjustable idler sprocket 83. The said chain is held into engagement with the under side of the sprocket 74 by means of the pinion 80, which is mounted on the stud 81, this stud extending laterally from the plate 82, which is secured to the vehicle body. The pinion 83, which acts as a support for the rear end of the driving chain 75, and also as a tightener for same, is mounted on an adjustable arm 85, the details of which, and its associated parts, are shown in Figs. 8 and 9. The arm 85 is provided with a longitudinal slot 86 intermediate of its length, and the plate 82 is provided with the arcuate slot 88 and the transversely extending slot 91 leading therefrom. A pin, or bolt, 87, engages the longitudinal slot 86 in the arm 85, and also the arcuate slot 88 in the plate 82, while the pin 90, at the lower end of the arm 85, projects inwardly and engages the transversely extending slot 91. By this arrangement it will be seen that the upper end of the arm 85 can be swung on the pin 90 as a pivotal center by loosening the bolt 87, or the arm can be moved bodily outwardly and inwardly in addition to the swinging movement. The sprocket pinion 83, which engages the rear end of the drive chain 75, is mounted upon the stud 84 in the upper end of the arm 85. This construction just described will therefore permit the drive chain not only to be tightened and loosened as required, but its wrap on the sprocket wheel 74 on the distributing cylinder may also be increased.

Immediately forward of the distributing cylinder 71 is arranged a rake for preventing the material from lodging against the distributing cylinder while the load is being applied and driven to the field, the said rake being raised when the cylinder is put in operation. This device consists of a series of rake fingers 92 mounted on a rod 93, the ends of which are engaged by the upper ends of the levers 94. These levers 94 are bell crank in shape and are pivoted at 94' on the vehicle body. The rake teeth, or fingers, 92 are held yieldingly downward by means of the spring 95, which is interposed between the upper end of the levers 94 and a fixed point on the frame of the machine. The crank portion 96 of one of the levers 94 (it being understood that one of the levers 94 is pivoted on each side of the machine) connects with the operating rod 97, which extends forwardly and engages with an arm 98 mounted on a rock shaft 99 at the forward end of the machine. A cam 100 and an operating lever 101 are fixed to this rock shaft 99, the operating lever carrying the usual hand-actuated spring-pressed pawl 102 for engaging with the segment rack 103 to hold said rock shaft in its adjusted position (see Fig. 3).

To raise and lower the rake teeth 92, and also to shift out of and into engagement the clutch on the axle 42, which controls the operation of the drive chain leading to the distributing cylinder, the following described device is employed: The sprocket wheel 76 is splined on the axle 42 and is movable endwise thereon. This sprocket wheel has fixed thereto a clutch member 104 designed to engage the clutch member 105, the latter member being attached to the loosely sleeved hub of one of the rear wheels 16. The hub of the clutch member 104 has an annular channel 104' formed therein for receiving the fingers of an actuating lever 106, which is pivotally mounted at 106' to swing horizontally at the side of the frame of the machine. The forward end of the actuating lever 106 is provided with an inclined cam surface 107 designed to be engaged by the lower end of the lever 108, which is pivoted at 108' on the body of the vehicle. This lever 108 is provided with a slot 108'' at its upper end, the said slot being adapted to receive a pin 109 extending from the rod 97, which operates to raise and lower the rake teeth 92. The lower end of the lever 108, when moving rearwardly, contacts the cam surface 107 on the actuating lever 106 and positively disengages the clutch members 104 and 105. These clutch members are thrown into engagement when the lower end of the lever 108 returns or moves forwardly by means of a spring 138 surrounding the rod 139. This rod 139 is pivoted at its outer end to the forward end of the lever 106, the said rod passing through an opening in the lower sill on the frame of the machine, the said spring 138 reacting between the frame and sill and a fixed collar 139' on said rod. By this arrangement above described, when the rod 97 is moved rearwardly the rake teeth will be raised, the lower end of the lever 108 will move forwardly along the cam surface 107, permitting the spring 138 to force the clutch member 104 into engagement with the clutch member 105, and, assuming that the clutch members 73 and 77 are in engagement with each other, movement will then be imparted to the distributing cylinder 71. The reverse movement of the lever 108 will operate to lower the rake teeth 92 and positively disengage the clutch members 104 and 105, as above described.

The automatic clutch shifting device on the forward end of the machine is constructed as follows: A vertically extending plate 110 is arranged at the forward end of the spreader frame (see Figs. 1 and 4) and nearer the right-hand side thereof. Through this plate, and extending rearwardly through the front of the spreader box, is located a shaft 111, to the forward end of which an automatic controlling lever 112 is attached, the said lever lying on the front side of the said plate. Rigidly secured to the inner end of this shaft 111 is a downwardly extending arm 113, from which a link 114 extends transversely to and connects with the end of an upwardly projecting arm 115 on the rock shaft 79. This rock shaft 79, it will be remembered, through the arm 78 on the rear end thereof, controls the clutch which throws into and out of operation the clutch members on the distributing cylinder shaft 71'. The lower end of the lever 112 is connected by means of the link 126 with the forward end of the lever 70, which controls the clutch members on the apron shaft 26. In order to effect this connection an opening is provided in the front end of the machine body (see Fig. 4), through which the forward end of the lever 70 projects, and an upturned lug 125 is fixed to said lever, with which the link 126 engages. It will thus be seen that if the upper end of the lever 112 is moved to the right in Fig. 4, which would be towards the left-hand side of the machine, the lever 70 will be made to engage the clutch members on the apron shaft, and, through the link connection of the said rock shaft 111 with the rock shaft 79, the arm 115 on said rock shaft 79 will be made to move to the left in Fig. 4 and thereby engage the clutch members 77 and 73 on the cylinder shaft 71'.

The automatic means for shifting the clutches, to which reference has already been made, operates in connection with the lever 112, and is constructed as follows: On the lever 112, adjacent its pivotal center 111, is fixed a bow-shaped spring 116, the ends thereof being deflected outwardly and terminating at substantially equal distances above and below the pivotal axis 111 of the said lever. This spring 116 is engaged above and below by the projecting pins 117 and 118, respectively, the said pins being fixed in a vertically disposed sliding bar 122, which reciprocates in the vertical slot 110' in the plate 110. A spring-held detention hook 119, pivotally mounted on the plate 110, engages the lower ends of the lever 112 and operates to hold it in the position shown in full lines in Fig. 4, in which position the clutches on the apron shaft controlled by the lever 70 and the clutch on the distributing cylinder shaft, controlled by the rock shaft 79, are held into engagement. A similar spring-held hook 120 is adapted to engage a lug 121 on the upper part of the lever 112 when said lever occupies its reverse position and has moved the parts which it controls into a position to reverse the apron.

The function of the sliding bar 122 is to automatically shift the lever 112 from its operative to reverse and from reverse to neutral positions. It is evident that the effect of the pin 117 bearing against the upper end of the spring 116 will be to move the top of the lever 112 to the right in Fig. 4, and that of the pin 118 against the lower end of said spring will be to move the lever in the reverse direction. The full line position of the lever 112 shown in Fig. 4 will, for brevity, be termed its operative position; the dotted line position in the same figure its reverse position, and the central vertical position (not indicated) will be termed its neutral position. Simultaneously with the pin 117 on the bar 122 reaching the upper end of the spring 116, the shoulder 122′ on the upper end of said bar will contact and lift the latch 120 from engagement with the lug 121, the parts before the latch is moved occupying the position shown in Fig. 4 but after the latch is raised the lever is immediately thrown to neutral position. Simultaneously with the bar 122 reaching the lower limit of its travel the pin 118 thereon will have approached the lower end of said spring 116, and the shoulder 122′ on the lower end of the bar will have contacted and disengaged the latch 119 from the lower end of the lever 112, after which the parts will occupy the position indicated by dotted lines in the same figure. The latches 119 and 120 are limited in their inward movement by the stops 120ᵃ, the springs 120ᵇ tending to hold the latches against said stops.

Reciprocating movement is imparted to the bar 122 by means of the toothed segment 124, which meshes with and is driven by the worm 35 on the end of the forward apron shaft 34 and link 123 connecting said segment and bar. It is apparent from the previous description of these parts that the forward apron shaft 34 will have a positive movement which will be definitely determined in extent by the movement of the apron, and hence with the proper velocity ratio provided between the worm 35 and segment 124 a definite positive movement will be imparted to the reciprocating bar 122. The velocity ratio between the segment 124 and its driving worm is such that simultaneously with the apron reaching the rearward and forward limits of its travel the stops 122¹ on the ends of the bar 122 engage and detach, respectively, the latches 119 and 120 from the lever 112.

Assuming suitable stops to be provided to limit the throw of the lever 112, then with the spreader advancing and the clutch members 104 and 105 in engagement, the mechanism just described will be operated automatically and continuously so long as the machine advances, the apron being automatically reversed at each end of its travel and the distributing cylinder stopped during the forward movement of the apron.

In order to automatically stop the apron at the forward end of its travel, as well as to automatically reverse it, the following described device is employed: At the upper end of the plate 110 is pivotally mounted the horizontally disposed stop lever 128, which is provided near its end with the stop lug 129, and near its center with another stop lug 130. The pin 127, which is made to project laterally from the lever 112, engages the said stops 129 and 130 on the lever 128, and thereby limit the swing of said lever 112. This pin 127 is mounted in a slot in the upper end of the lever 112 and is yieldingly held in its lower position in said slot by means of the spring 127′. About midway between the stops 129 and 130 is also formed an intermediate stop 130ᵃ, this intermediate stop being of less height than the stops 129 and 130. On the outer end of the rod 128 is pivotally secured, by slotted connection, the vertical rod 132, which is adapted to slide up and down in the lugs 133 on the plate 110. A spring 134 surrounds the rod 132 and reacts between one of the lugs 133 and the collar 135 fixed on said rod, this spring operating to hold the lever 128 normally in a horizontal position, as indicated in the full lines in Fig. 4. When in this position the pin 127 in the upper end of the lever 112 will yield and permit the said lever to move from right to left, the pin slipping over the intermediate stop lug 130ᵃ. On the other hand, when the upper end of said lever is caused to be moved by its actuating mechanism to the right and the lever 128 is horizontal, the intermediate stop lug 130ᵃ will be impinged by the pin 127 and the lever 112 stopped at its central or neutral position; that is, with the apron and distributing cylinder out of engagement. The lugs 129 and 130 being higher than the intermediate lug 130ᵃ, will insure the lever 112 being stopped at its limit of movement to the right or left. A depression of the right-hand side of the lever 128 (that is, the right hand end as viewed in Fig. 4) will operate to disengage the pin 127 from the stop lug 130ᵃ, and the spring 116 will force said lever into its operative position. Unless the normal position of the lever 128 is immediately restored, the said stop lug 130ᵃ will not be in position to catch the pin 127 on its next movement to the right, hence the lever 128 is only momentarily depressed an amount sufficient to permit the pin to pass over the stop lug 130ᵃ. This movement of the lever 128 is effected by means of the cam 100 on the end of the rock shaft 99. In moving the rock shaft from its in position to its out position, this cam will move the rod 132 upwardly, after which it will drop and permit the lever 128 to lie in its normal horizontal position. It will thus be seen that on the plate 110 is mounted a single device, or mechanism, for automatically reversing the apron at the end of its movement both rearwardly and reverse; and it will also be observed that the controlling lever on the rock shaft 99 is supplied with a connection consisting of the cam 100, the horizontally disposed stop lever 128 and the other connecting members, these last constituting means for throwing into and out of operation the said automatic apron reversing mechanism by said controlling lever. It will be noted in Fig. 3 that the inner upper end of the apron has an upwardly extending plate 136 which causes the load to move along the apron when discharging and supports the front end of the load. This plate is best supported by means of rollers 137, running on suitable tracks.

One complete cycle of the operation of the entire machine will be briefly described. The lever 112 lies in its neutral vertical position, with the pin 127 resting against the stop lug 130ᵃ. In rocking the hand lever 101 rearwardly to the full line position shown in Fig. 1, the rake teeth 92 will be raised through the rod 97, and through the rock lever 108, the lever 106 and the spring 138 the clutch members 104 and 105 on the axle 42 will be thrown into engagement as heretofore described. The cam 100 will operate to momentarily depress the right-hand side of the rock lever 128, as before described, permitting the pin 127 to pass over the top of the stop lug 130ᵃ, and the lever 112 will move to the full line position of Fig. 4, and thus, through the lever 70, to throw the clutch member 45 into engagement with the clutch head 46 on the sleeve 47, and in this manner operate the apron drive shaft rearwardly.

Simultaneously with the shifting of the lever 70 the rock shaft 79 will be moved through the depending arm 113 on the rock shaft 111, the link 114 and the arm 115, in this manner shifting the clutch member 77 into engagement with the clutch member 73, and thus movement will be imparted to the cylinder 71. The mechanism will continue in operation, the apron moving rearwardly, and by the time the said apron has reached its rearward position and discharged its load, the worm 35 on the shaft 34 will rotate the segment 124, and, through the link connection 123 with the bar 122, will pull said bar downwardly, the pin 118 bearing with constantly increasing pressure against the lower end of the spring 116 until the projecting shoulder 122' on the lower end of the said sliding bar contacts and disengages the latch 119 from the lower end of the lever 112. On the release of this latch 119 the lower end of the spring 116 will force the lever to its reversed position, by which movement the lever 70 will be caused to move in the opposite direction and shifting the cone clutch member 44 into engagement with its coöperating clutch member 43 on the apron shaft 26, thus throwing into engagement the apron return mechanism. Simultaneously with this movement the rock shaft 79 will be moved in the reverse direction by its link connection with the rock shaft 111 and the clutch member 77 disengaged from the clutch member 73, causing the distributing cylinder 71 to stop.

It will be remembered that the horizontal lever 128, after being momentarily depressed through the cam 100 on the rock shaft 99, when the lever 101 is moved to engaging position, now lies in its normal horizontal position. The pin 127 will slide over the lug 130ᵃ in the movement of the top of the lever 112 to the left as seen in Fig. 4. As the apron moves to its forward position the sliding trip bar 122 will be raised to its upper position through the worm 35, the segment and its connections, and simultaneously with the apron reaching its position forwardly the said trip lever will disengage the latch 120 and the pin 117 will force the top of the lever to the right again. As the stop lug 130ᵃ, however, lies in the path of the pin 127, it can move to the right only to the central position, thus leaving the apron in its forward position ready to return but out of gear, and the distributing cylinder also out of gear. The controlling lever 101 is now moved forward to its inoperative position, lowering the rake teeth 92 and disengaging the clutch member 104 from the clutch member 105, thereby stopping all moving parts of the machine. It will be observed that in this forward movement of the controlling lever the cam 100 will again depress the lever 128 momentarily, which will cause the lever 112 to be thrown to an operative position. This, however, is of no consequence, as none of the driving clutches are in engagement.

Having thus described my invention, what I claim as new and desire to secure by Letters Patent, is:

1. A fertilizer spreader comprising a body, a rear axle fixed to the under side of the body, wheels loosely mounted on said axle, an apron provided with a sprocket chain and movable in the bottom of the body, an apron shaft, a sprocket wheel on said shaft for engaging with the sprocket chain on said apron, a sleeve loosely mounted on the apron shaft, a clutch mechanism adapted to be operated from the front of the body for placing said sleeve in operative connection with the apron shaft, a ratchet wheel on said sleeve, arms mounted to swing on the sleeve, a pawl carried by said arms for engaging with the ratchet wheel, an eccentric sleeve rotatably fixed but longitudinally movable on the axle, the said sleeve being provided with a spiral rib, an eccentric having a channel at its inner side for receiving said spiral rib, a rod connection between the eccentric and the said pawl, and means under the control of the operator for effecting the endwise movement of said eccentric sleeve and thereby regulate the throw of said eccentric.

2. A fertilizer spreader comprising a body, a rear axle fixed to the under side of the body, wheels loosely mounted on said axle, an apron provided with a sprocket chain and movable in the bottom of the body, an apron shaft, a sprocket wheel on said shaft for engaging with the sprocket chain on said apron, a sleeve loosely mounted on the apron shaft, a clutch mechanism adapted to be operated from the front of the body for placing said sleeve in operative connection with the apron shaft, two ratchet wheels secured to said sleeve, arms mounted on said sleeve adjacent to said wheels, pawls carried by said arms for engaging with the ratchet wheels, a double eccentric sleeve rotatively fixed but longitudinally movable on the axle, the two portions of said eccentric sleeve being oppositely disposed with respect to their eccentricity, oppositely inclined spiral ribs on the two portions of said eccentric sleeve, eccentrics mounted on said sleeve and provided with channels for receiving said spiral ribs, connecting rods extending between the eccentrics and said pawls, and means under the control of the operator for effecting the endwise movement of said eccentric sleeve and thereby regulating the throw of said eccentrics, said means comprising a spring-held sleeve-engaging arm, a V-shaped cam and a rod and lever for operating said cam.

3. A fertilizer spreader comprising a wheel-mounted body, an apron mounted to move back and forth therein and forming the bottom thereof, a distributing cylinder mounted at the rear end of the body, a driving sprocket wheel mounted loosely on the rear axle of the vehicle, a sprocket wheel on the shaft of the distributing cylinder, a sprocket wheel adjustably mounted on the spreader frame in the rear of the sprocket wheel on the distributing cylinder shaft, a sprocket chain engaging the under side of the sprocket wheel on the distributing cylinder shaft and connecting the said driving sprocket wheel and the adjustably mounted sprocket wheel, a clutch mechanism in connection with the sprocket wheel on the distributing cylinder, a clutch mechanism in connection with the driving sprocket wheel on the axle, and means for moving the two clutch mechanisms in to and out of engagement.

4. A fertilizer spreader comprising a wheel-mounted body, an apron arranged to move back and forth therein and in the bottom thereof, a distributing cylinder mounted at the rear end of the body, a sprocket wheel on the shaft of said cylinder, a driving sprocket wheel having a clutch connection with one of the supporting wheels of the spreader, a plate secured to the side of the spreader body in which the sprocket bearing end of the cylinder shaft journals, the said plate being provided with an arcuate slot and a transversely extending slot leading therefrom, an adjustable slotted arm having a pin at its lower end which engages in the transversely extending slot, a stud extending through the slot of the arm and engaging the arcuate slot in the plate, a sprocket wheel mounted on the upper end of said arm, and a sprocket chain adapted to engage the said driving sprocket wheel, the sprocket wheel on the adjustable arm and the under side of the sprocket wheel on the distributing cylinder shaft.

5. A fertilizer spreader comprising a wheel-mounted body, an apron movable therein and forming the bottom thereof, a rear axle, a rear wheel loosely mounted on the axle and carrying a clutch member, a sprocket wheel provided with a coöperating clutch member slidable on said axle, a distributing cylinder driven from said sprocket wheel, a shifting lever connecting with the slidable sprocket on the axle, the said lever having an inclined cam at its forward end, a vertically disposed lever mounted to swing on the body and adapted to engage at its lower end the said cam and move the sprocket wheel and clutch member thereon, a rake mounted to swing vertically to and from a position in front of the distributing cylinder, a lever and rock shaft located at the forward end of the body, and an operative connecting means interposed between said rock shaft and rake, said connecting means engaging the upper end of the vertically disposed lever whereby both the clutch member on the axle and said rake are controlled by the said lever.

JOHN O. LINDEN.

Witnesses:
S. K. DENNIS,
JAMES A. MOXEY.